No. 711,704. Patented Oct. 21, 1902.
D. G. HORTON & J. M. NICHOLSON.
NUT LOCK.
(Application filed Feb. 3, 1902.)
(No Model.)
Fig. 1.
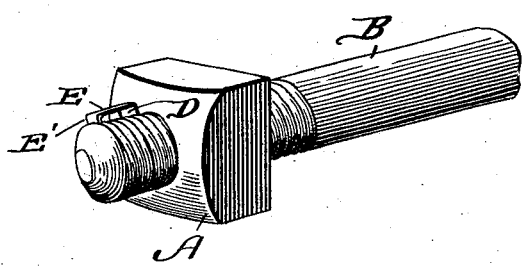
Fig. 2.
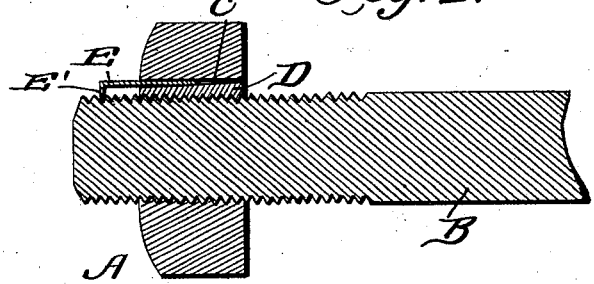
Fig. 3.
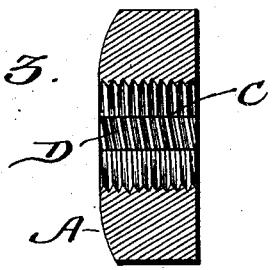
Fig. 4.
Fig. 5.
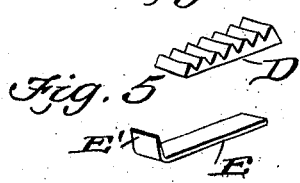
Fig. 6.
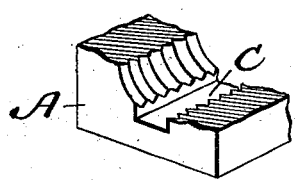
Witnesses
M. A. Blondell
Jaunce J. Shaw
Inventors
D. G. Horton,
J. M. Nicholson,
By
Attorneys
THE NORRIS PETERS CO., PHOTO-LITHO., WASHINGTON, D. C.

UNITED STATES PATENT OFFICE.

DOC GLEN HORTON AND JAMES MARSHALL NICHOLSON, OF ATTALLA, ALABAMA.

NUT-LOCK.

SPECIFICATION forming part of Letters Patent No. 711,704, dated October 21, 1902.

Application filed February 3, 1902. Serial No. 92,429. (No model.)

*To all whom it may concern:*

Be it known that we, DOC GLEN HORTON and JAMES MARSHALL NICHOLSON, citizens of the United States, residing at Attalla, in the county of Etowah and State of Alabama, have invented a new and useful Nut-Lock, of which the following is a specification.

This invention relates generally to nut-locks, and more particularly to that class thereof known as "thread" nut-locks, the object being to provide a cheap and simple construction whereby a nut can be securely fastened upon a bolt, and another object is to provide a fastening means of such character that it can be quickly and easily removed when desired.

With these objects in view the invention consists in the novel features of construction hereinafter referred to, and pointed out in the claims.

In the drawings forming part of this specification, Figure 1 is a view illustrating a nut-lock constructed in accordance with our invention. Fig. 2 is a sectional view of the bolt, nut, and lock. Fig. 3 is a detail sectional view of the nut. Fig. 4 is a detail perspective view of the serrated plate. Fig. 5 is a detail perspective view of the locking-key. Fig. 6 is a sectional perspective illustrating the recessed or grooved portion of the nut.

In carrying out our invention we employ a nut A, which is adapted to be screwed upon the ordinary bolt B. This nut has a recess or groove C produced in one side of its central bore, said groove or recess being produced for the purpose of receiving the serrated plate D, the serrations being cut upon a pitch differing from the pitch of the threads of the central bore. This serrated plate is preferably made in the form of a wedge, the narrow edge being arranged uppermost, and the locking key or wedge E is adapted to be forced between the said serrated plate and the inner wall of the recess or groove, thereby forcing the serrations of the plate against the thread of the bolt and firmly locking the nut in place. The locking-key E has an inwardly-bent end E', which is adapted to engage the threads upon the bolt, as most clearly shown in Fig. 2, thereby holding the said key in position.

In operation the nut is screwed upon the bolt and the serrated plate inserted in the recess or groove. The locking-key is then driven in, forcing the serrated plate against the threads of the bolt and securely locking the nut in place. When it is desired to remove the nut, the locking-key can be easily withdrawn, and inasmuch as the wedge action is thus relieved the nut can be easily unscrewed. If desired, the locking-key can be made in the form of a wedge, thereby increasing the binding action of the serrated plate.

Having thus fully described our invention, what we claim as new, and desire to secure by Letters Patent, is—

1. In a nut-lock the combination with a recessed or grooved nut, of a serrated plate adapted to rest within the said recess or groove, and the key adapted to be forced between the said plate and rear wall of the groove for the purpose specified.

2. A nut-lock comprising in combination a nut having a recess or groove at one side, a serrated plate adapted to rest in said recess or groove, the serrations of the plate being cut upon a pitch differing from the pitch of the thread of the nut, and the key adapted to be forced into the recess at the rear of the serrated plate for the purpose described.

3. A nut-lock comprising in combination a nut having a recess or groove at one side, the serrated plate adapted to rest within the groove, said plate being wedge-shaped and having the serrations cut upon the pitch different from the pitch of the thread of the nut, and the locking-key adapted to be forced into the recess behind the serrated plate, the end of said key being bent for the purpose specified.

DOC GLEN HORTON.
JAMES MARSHALL NICHOLSON.

Witnesses:
A. J. BENNETT,
R. F. MCCONNELL.